United States Patent
Hamilton et al.

(10) Patent No.: US 10,026,325 B2
(45) Date of Patent: Jul. 17, 2018

(54) GRAPHICAL USER INTERFACE FOR OPTIMIZATION OF FLIGHT PLAN SCHEDULE, RIDE QUALITY, AND EFFICIENCY

(71) Applicant: THE BOEING COMPANY, Chicago, IL (US)

(72) Inventors: James R. Hamilton, Federal Way, WA (US); Kenneth Sain, Denver, CO (US)

(73) Assignee: THE BOEING COMPANY, Chicago, IL (US)

(*) Notice: Subject to any disclaimer, the term of this patent is extended or adjusted under 35 U.S.C. 154(b) by 0 days.

(21) Appl. No.: 15/267,423

(22) Filed: Sep. 16, 2016

(65) Prior Publication Data

US 2018/0082595 A1    Mar. 22, 2018

(51) Int. Cl.
*B64D 43/00*      (2006.01)
*G08G 5/00*       (2006.01)

(52) U.S. Cl.
CPC ........... *G08G 5/0039* (2013.01); *B64D 43/00* (2013.01)

(58) Field of Classification Search
CPC ...... G08G 5/0039; B64D 43/00; B60D 45/00; G06Q 10/06; G06Q 10/063; G06Q 10/047; G01C 21/00; G01C 23/00
See application file for complete search history.

(56) References Cited

U.S. PATENT DOCUMENTS

| | | | |
|---|---|---|---|
| 6,134,500 A * | 10/2000 | Tang ............... | G06Q 10/047 701/10 |
| 6,965,816 B2 * | 11/2005 | Walker ............... | B64C 13/20 244/189 |
| 8,165,809 B1 * | 4/2012 | Baker ............... | G01C 21/00 701/533 |
| 8,694,184 B1 * | 4/2014 | Boorman ............... | G01C 23/00 340/945 |
| 9,205,916 B2 * | 12/2015 | Boorman ............... | G01C 23/00 |
| 9,718,558 B2 * | 8/2017 | Ball ............... | B64D 45/00 |

(Continued)

OTHER PUBLICATIONS

Zhang et al., A Hierarchical Flight Planning Framework for Air Traffic Management, 2011, IEEE, p. 179-194.*

(Continued)

*Primary Examiner* — McDieunel Marc
(74) *Attorney, Agent, or Firm* — Patterson + Sheridan, LLP

(57) ABSTRACT

An aircraft system, computer-implemented method, and computer program product for optimizing a flight plan for schedule, ride quality, and efficiency is provided. Tradeoff preferences between on-schedule operations, ride quality, and efficiency are received. A multi-axis chart that includes axes for on-schedule operations, ride quality, and efficiency is displayed. Values are arranged along the respective axes based on the tradeoff preferences. When a flight plan is received, values for on-schedule operations, ride quality, and efficiency are extracted. A triangle is overlaid on the multi-axis chart such that apexes of the triangle intersect the respective axes at locations corresponding to the extracted values. When multiple optional flight plans are received, multiple triangles corresponding to the respective flight plans can be overlaid on the multi-axis chart. The pilot can identify a most-preferable flight plan based on visual differences between the triangles.

20 Claims, 5 Drawing Sheets

(56) References Cited

U.S. PATENT DOCUMENTS

| | | | |
|---|---|---|---|
| 2008/0201183 A1* | 8/2008 | Jha | G06Q 10/063 701/120 |
| 2008/0215406 A1* | 9/2008 | Pachon | G06Q 10/06 705/7.16 |
| 2014/0074324 A1* | 3/2014 | Burgin | G08G 5/02 701/9 |

OTHER PUBLICATIONS

Schreur, B737 flight management computer flight plan trajectory computation and analysis, 1995, IEEE, p. 3419-3424.*

Layton et al., Graphical interfaces for cooperative planning systems, 1990, IEEE, p. 508-511.*

Zelinski et al., Framework for Integrating Arrival, Departure, and Surface Operations Scheduling, 2014, IEEE, p. 1-17.*

* cited by examiner

GRAPHICAL USER INTERFACE FOR OPTIMIZATION OF FLIGHT PLAN SCHEDULE, RIDE QUALITY, AND EFFICIENCY

BACKGROUND

Pilots typically fly aircraft according to a flight plan to guide the aircraft from the departure airport to an airport. In the case of commercial aircraft, the flight plan is often prepared by a dispatcher or other non-pilot employee of the commercial aircraft operator. The dispatcher generates a flight plan that best achieves goals of the commercial aircraft operator. Such goals include arriving on time, performing the flight for minimum cost, and performing the flight with maximum possible passenger comfort.

Often, an aircraft flight is not performed exactly as planned. For example, weather and/or other air traffic may cause an aircraft to divert from a planned route, fly slower than planned, and/or fly lower than planned. When such in air deviations occur, it is the pilots' responsibility to determine whether to further modify the flight plan to recover from the deviation and, if so, how to modify the flight plan. For example, a pilot may contemplate deviating around a storm, but the deviation increases the total travel distance for the flight and therefore results in a delayed arrival. The pilot may contemplate increasing speed to avoid the delayed arrival, but such increased speed results in more fuel being burned and, potentially, a more expensive flight. The pilot may also consider not deviating from the flight plan and flying through the weather, but the weather may cause a bumpy, unpleasant flight experience for the passengers.

SUMMARY

According to one aspect, an aircraft system comprises a computer display screen, a computer processor, and a computer memory in communication with the computer processor. The computer memory is operable to store tradeoff preferences for a user. The tradeoff preferences for the user comprise a first tradeoff preference between an on-schedule operation characteristic and a ride quality characteristic of flight plans. The tradeoff preferences for the user also comprise a second tradeoff preference between the ride quality characteristic and an operation efficiency characteristic of the flight plans. The tradeoff preferences for the user also comprise a third tradeoff preference between the operation efficiency characteristic and the on-schedule operation characteristic for the flight plans. The memory is also operable to store an application that, when executed on the computer processor, outputs for display on the computer display screen an image of a multi-axis chart. The multi-axis chart comprises a first axis for on-schedule operation, wherein values for the on-schedule operation characteristic along the first axis are weighted based on the tradeoff preferences. The multi-axis chart also comprises a second axis for ride quality, wherein values for the ride quality characteristic along the second axis are weighted based on the tradeoff preferences. The multi-axis chart also comprises a third axis for operation efficiency, wherein values for the operation efficiency characteristic along the third axis are weighted based on the tradeoff preferences. The application also receives an initial flight plan that includes a first on-schedule operation characteristic value, a first ride quality characteristic value, and a first operation efficiency characteristic value. The application also overlays on the multi-axis chart a first triangle, wherein apexes of the first triangle are aligned with the axes of the chart such that a first apex of the first triangle intersects the first axis of the chart at a location corresponding to the first on-schedule operation characteristic value, a second apex of the first triangle intersects the second axis of the chart at a location corresponding to the first ride quality characteristic value, and a third apex of the first triangle intersects the third axis of the chart at a location corresponding to the first operation efficiency characteristic value.

According to one aspect, a computer-implemented method comprises receiving tradeoff preferences for a user. The tradeoff preferences comprise a first tradeoff preference between an on-schedule operation characteristic and a ride quality characteristic of flight plans. The tradeoff preferences also comprise a second tradeoff preference between the ride quality characteristic and an operation efficiency characteristic of the flight plans. The tradeoff preferences also comprise a third tradeoff preference between the operation efficiency characteristic and the on-schedule operation characteristic of the flight plans. The method also comprises outputting for display on a computer display screen an image of a multi-axis chart. The multi-axis chart comprises a first axis for on-schedule operation, wherein values for the on-schedule operation characteristic along the first axis are weighted based on the tradeoff preferences. The multi-axis chart also comprises a second axis for ride quality, wherein values for the ride quality characteristic along the second axis are weighted based on the tradeoff preferences. The multi-axis chart also comprises a third axis for operation efficiency, wherein values for the operation efficiency characteristic along the third axis are weighted based on the tradeoff preferences. The method also comprises receiving an initial flight plan that includes a first on-schedule operation characteristic value, a first ride quality characteristic value, and a first operation efficiency characteristic value. The method also comprises overlaying on the multi-axis chart a first triangle, wherein apexes of the first triangle are aligned with the axes of the chart such that a first apex of the first triangle intersects the first axis of the chart at a location corresponding to the first on-schedule operation characteristic value, a second apex of the first triangle intersects the second axis of the chart at a location corresponding to the first ride quality characteristic value, and a third apex of the first triangle intersects the third axis of the chart at a location correspond to the first operation efficiency characteristic value.

According to one aspect, a computer program product for displaying tradeoffs for an aircraft flight plan is provided. The computer program product comprises a computer-readable storage medium having computer-readable program code embodied therewith. The computer-readable program code is executable by one or more computer processors to receive tradeoff preferences for a user. The tradeoff preferences comprise a first tradeoff preference between an on-schedule operation characteristic and a ride quality characteristic of flight plans. The tradeoff preferences also comprise a second tradeoff preference between the ride quality characteristic and an operation efficiency characteristic of the flight plans. The tradeoff preferences also comprise a third tradeoff preference between the operation efficiency characteristic and the on-schedule operation characteristic of the flight plans. The computer-readable program code is also executable to output for display on a computer display screen an image of a multi-axis chart. The multi-axis chart comprises a first axis for on-schedule operation, wherein values for the on-schedule operation characteristic along the first axis are weighted based on the tradeoff preferences. The multi-axis chart also comprises a second axis for ride quality, wherein values for the ride quality characteristic along the second axis are weighted based on the tradeoff preferences. The multi-axis chart also comprises a third axis for operation efficiency, wherein values for the operation efficiency characteristic along the third axis are weighted based on the tradeoff preferences. The computer-readable program code is also executable to receive an initial flight plan that includes a first on-schedule operation characteristic value, a first ride quality characteristic value, and a first operation efficiency characteristic value. The computer-readable program code is also executable to overlay on the multi-axis chart a first triangle, wherein apexes of the first triangle are aligned with the axes of the chart such that a first apex of the first triangle intersects the first axis of the chart at a location corresponding to the first on-schedule operation characteristic value, a second apex of the first triangle intersects the second axis of the chart at a location corresponding to the first ride quality characteristic value, and a third apex of the first triangle intersects the third axis of the chart at a location correspond to the first operation efficiency characteristic value.

DETAILED DESCRIPTION

In the following, reference is made to aspects presented in this disclosure. However, the scope of the present disclosure is not limited to specific described aspects. Instead, any combination of the following features and elements, whether related to different aspects or not, is contemplated to implement and practice contemplated aspects. Furthermore, although aspects disclosed herein may achieve advantages over other possible solutions or over the prior art, whether or not a particular advantage is achieved by a given aspect is not limiting of the scope of the present disclosure. Thus, the following aspects, features, aspects and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As discussed above, a pilot may have to consider many factors when deciding when and how to deviate from a flight plan. The currently available flight planning tools do not enable the pilot to quickly compare various flight plan options during flight to understand which of the various flight plans offers the best result.

In aspects described herein, a graphical user interface (GUI) provides a pilot with a geometric representation of various characteristics of one or more flight plans. In the exemplary aspects described herein, the flight plans are represented as triangles, wherein apexes is of the triangle are aligned with axes of a multi-axis chart. At least one aspect, different triangles for different flight plans can be overlaid on top of the multi-axis chart such that the pilot can quickly grasp the strengths and weaknesses of the different plans and therefore quickly flight plan to continue the flight.

Figure 1:
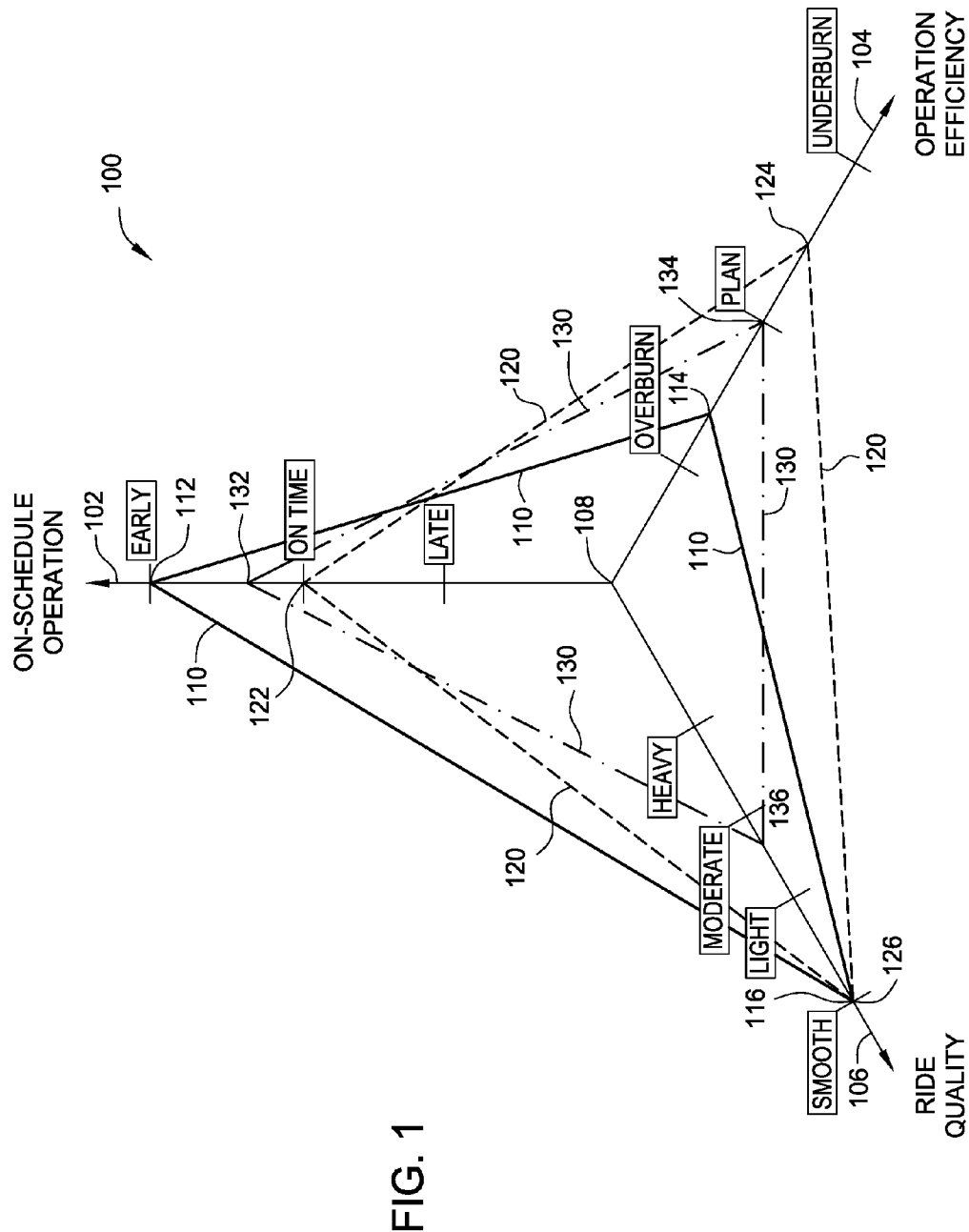
FIG. 1 is an exemplary graphical user interface (GUI), according to one aspect, illustrating a multi-axis chart with different triangles representing different flight plans overlaid thereon.

FIG. 1 illustrates a multi-axis chart 100 that includes a first axis 102, a second axis 104, and a third axis 106 extending outward from an origin 108. The first axis 102 is related to an on-schedule operation characteristic for the flight plan, and includes an "on time" value, a "late" value, and an "early" value arranged along the first axis 102. Generally, airlines prefer that aircraft arrive on time or early because late arrivals can delay passengers' connecting flights and extend the duty times of pilots and flight attendants, for example. Thus, the values along the first axis 102 are arranged with the least-desirable value closest to the origin 108 and the most-desirable outcome arranged furthest from the origin 108. In some instances, early arrivals may also be undesirable. For example, at certain heavily congested airports, an aircraft may be assigned an arrival window and will have to wait to land if it arrives early. Thus, in such circumstances the "on time" value could represent the most-desirable value and be positioned along the first axis 102 further from the origin 108 than the "early" value.

The second axis 104 is related to an operation efficiency characteristic for the flight plan. In the exemplary multi-axis chart 100, the second axis 104 includes a "plan" value (i.e., the flight plan is predicted to use an amount of fuel predicted by the original flight plan), an "under burn" value (i.e., the flight plan is predicted to use less fuel than the original flight plan), and an "over burn" value (i.e. the flight plan is predicted to use more fuel than the original flight plan). Again, the least-desirable value is arranged on the second axis 104 closest to the origin 108 and the most-desirable value is arranged furthest from the origin 108. In the exemplary multi-axis chart 100, the value on the second axis 104 are described solely in terms of fuel burn. However, other costs also may be accounted for on the second axis 104. For example, a change to the flight plan could affect the arrival time, and a changed arrival time could affect airport fees that are paid, crew wages, and other fees. As another example, a particular aircraft may be scheduled for a maintenance cycle upon arrival, and a delayed arrival may result in significant over time for maintenance workers on the ground, waiting for the aircraft. Such costs could also be incorporated into the values shown on the second axis 104.

The third axis 106 is related to a ride quality characteristic for the flight plan. In the exemplary multi-axis chart 100, the third axis 105 includes a "smooth" value, a "light" value, a "moderate" indication, and a "heavy" value. The indications relate to turbulence, wherein a "smooth" value means that the passengers are unlikely to feel any significant turbulence and a "heavy" value means that the passengers are likely to experience uncomfortable turbulence, for example. Again, the least-desirable value is arranged on the third axis 106 closest to the origin 108 and the most-desirable value arranged is arranged furthest from the origin 108. In various aspects, the values on the third axis 106 could account for other ride quality characteristics, such as visibility or views. For example, a flight plan that provides passengers with views of the ground below may be preferable to flight plans that fly over a cloud layer obscuring the ground. As another example, a flight plan that provides passengers with views of scenic locations on the ground below (e.g., the Grand Canyon) may be more desirable than flight plans that do not provide such views.

A flight plan can be represented on the multi-axis chart 100 by calculating values for the on-schedule operation characteristic, the operation efficiency characteristic, and the ride quality characteristic. A triangle is then overlaid on the multi-axis chart 100 such that apexes of the triangle intersect the three axes 102, 104, and 106 of the multi-axis chart 100 at locations corresponding to the respective values of the characteristics. As discussed above, more-desirable values are arranged further from the origin 108 than less-desirable values along the three axes 102, 104, and 106. Thus, a more-desirable updated flight plan generally results in a larger triangle then a less-desirable updated flight plan.

FIG. 1 illustrates the multi-axis chart 100 with a first triangle 110 for a first flight plan (depicted as a solid line), a second triangle 120 for a second flight plan (depicted as a broken line), and a third triangle 130 for a third flight plan (depicted as a varying broken line) overlaid thereon. With respect to the first triangle 110, a first apex 112 intersects the first axis 102 of the multi-axis chart 100 at the "early" value of the on-schedule operation characteristic. A second apex 114 of the first triangle 110 intersects the second axis 104 of the multi-axis chart 100 between the "over burn" and "plan" values of the operation efficiency characteristic. A third apex 116 of the first triangle 110 intersects the third axis 106 of the multi-axis chart 100 at the "smooth" value of the ride quality characteristic.

With respect to the second triangle 120, a first apex 122 intersects the first axis 102 of the multi-axis chart 100 at the "on time" value of the on-schedule operation characteristic. A second apex 124 of the second triangle 120 intersects the second axis 104 of the multi-axis chart 100 between the "plan" and the "under burn" values of the operation efficiency characteristic. A third apex 126 of the second triangle 120 intersects the third axis 106 of the multi-axis chart 100 at the "smooth" value of the ride quality characteristic.

With respect to the third triangle 130, a first apex 132 intersects the first axis 102 of the multi-axis chart 100 between the "on time" and "early" values of the on-schedule operation characteristic. A second apex 134 of the third triangle 130 intersects the second axis 104 at the "plan" value of the operation efficiency characteristic. A third apex 136 of the third triangle 130 intersects the third axis 106 of the multi-axis chart 100 at the "moderate" value of the ride quality characteristic.

In one aspect, the first triangle 110, the second triangle 120, and/or the third triangle 130 can be displayed one at a time. For example, the first triangle 110 may be overlaid on the multi-axis chart 100 first. Thereafter, the first triangle 110 may be removed from the multi-axis chart 100 and the second triangle 120 can be overlaid on the multi-axis chart 100. Thereafter, the second triangle 120 may be removed from the multi-axis chart 100 and the third triangle 130 can be overlaid on the multi-axis chart 100. In another aspect, the first triangle 110, the second triangle 120, and/or the third triangle 130 can be simultaneously overlaid on the multi-axis chart 100. In such aspects, the triangles 110, 120, and 130 can be visually distinguished from one another. For example, the triangles can have different line styles (e.g., solid line, broken line, etc.). As another example, the triangles can have different line colors. In various aspects, the triangles could be filled with solid colors, and the different triangles could have different degrees of transparency such that the triangles are discernible to a user. For example, the first triangle 110 could be designated as the bottom triangle and rendered opaque or nearly opaque (i.e., not transparent). The second triangle 120 could be designated as resting on top of the first triangle 110 and rendered 66% opaque (i.e., partially transparent) such that portions of the first triangle 110 beneath the second triangle 120 are visible and not obscured. The third triangle 130 could be designated as resting on top of the second triangle 120 and rendered 33% opaque such that portions of the first triangle 110 and portions of the second triangle 120 beneath the third triangle 130 are visible and not obscured.

In various aspects, the multi-axis chart 100 could display more or fewer than the three triangles 110, 120, and 130 illustrated in FIG. 1.

Figure 2:
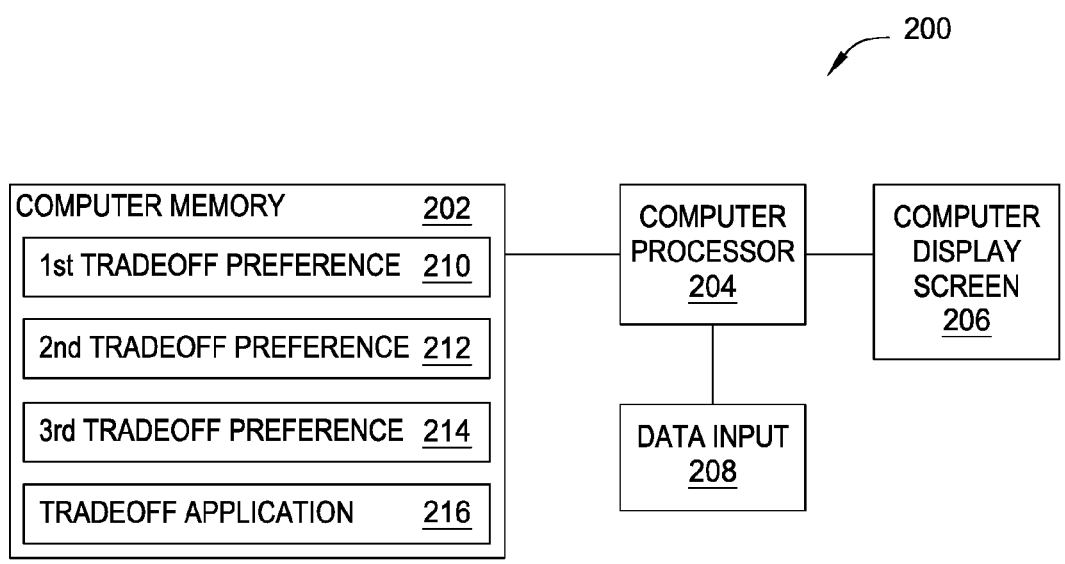
FIG. 2 is a block diagram of a system, according to one aspect, for generating the GUI depicted in FIG. 1.

FIG. 2 is a block diagram illustrating a system 200 for displaying the multi-axis chart 100 and triangular representations of flight plans thereon. The system 200 includes a computer memory 202 in communication with the computer processor 204. The computer processor 204 is also in communication with a computer display screen 206. In one aspect, the computer display screen 206 could be an avionics display screen in the flight deck of an aircraft. For example, the multi-axis display 100 could be displayed on a multi-function display (MFD), a primary flight display (PFD), and/or an engine indicating in crew alerting system (EICAS) display. In another aspect, the computer display screen 206 could be an electronic flight bag display that could be integral to the flight deck or available on a personal electronic device, such as a tablet computer. In various aspects, the computer processor 204 could communicate with computer display screen 206 via a wired or wireless interface. The computer processor 204 is also in communication with a data input 208. The computer processor 204 can receive flight plans via the data input. Received flight plans include an on-schedule operation characteristic value, an operation efficiency characteristic value, and a ride quality characteristic value.

The computer memory 202 stores tradeoff preferences of a user. In the context of commercial aircraft, the user may be an airline operating an aircraft. The computer memory 202 stores a first tradeoff preference 210 between an on-schedule operation characteristic and a ride quality characteristic of flight plans. The computer memory 202 also stores a second tradeoff preference 212 between the ride quality characteristic and an operation efficiency characteristic of flight plans. The computer memory 202 also stores a third tradeoff preference between the operation efficiency characteristic and the on-schedule operation characteristic of flight plans. The computer memory 202 also stores a tradeoff application 216. The tradeoff application 216 is executable on the computer processor 204 to generate the multi-axis chart 100 and the triangles representing flight plans in accordance with the on-schedule operation characteristics, operation efficiency characteristics, and ride quality characteristics of the respective flight plans.

Figure 3:
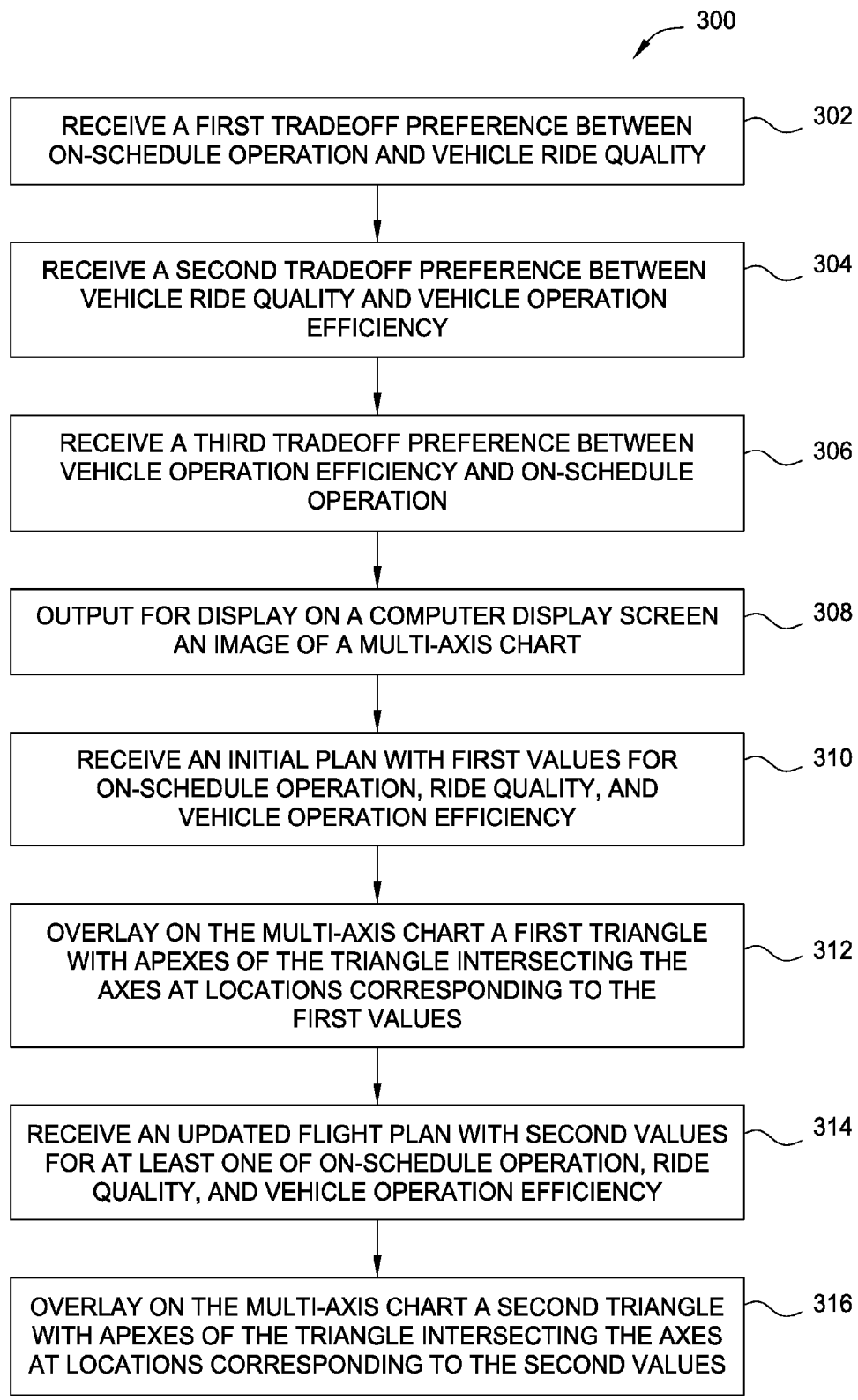
FIG. 3 is a flow chart of a method, according to one aspect, for generating the GUI depicted in FIG. 1.

FIG. 3 is a flowchart illustrating a method 300 for displaying the multi-axis chart 100 and overlaying triangular representations of flight plans thereon. In block 302, a first tradeoff preference 210 between an on-schedule operation characteristic and a ride quality characteristic is received. In block 304, a second tradeoff preference 212 between the ride quality characteristic and an operation efficiency characteristic is received. In block 306, a third tradeoff preference 214 between the operation efficiency characteristic and the on-schedule operation characteristic is received. As discussed above with reference to FIG. 2, the tradeoff preferences may be stored in computer memory 202 and accessed by the computer processor 204. In block 308, a multi-axis chart 100 is output for display on a computer display screen. In the aspects discussed herein, the multi-axis chart 100 includes a first axis 102 for the on-schedule operation characteristic, a second axis 104 for the operation efficiency characteristic, and a third axis 106 for the ride quality characteristic. Values for the characteristics are positioned along the axes 102, 104, and 106 based on weightings based on the received tradeoff preferences. For example, in a scenario in which an aircraft operator emphasizes low-cost operations, the "plan" and "underburn" values along the second axis 104 could be moved further away from the origin 108 of the multi-axis chart 100 and the "overburn" value could be moved closer to the origin 108. Additionally, due to the tradeoff preferences 210, 212, and 214 indicating that the operation efficiency is more important than on-schedule operation and ride quality in this scenario, the "plan" and "underburn" values along the second axis 104 could be moved further away from the origin 108 of the multi-axis chart 100 than the "on time" and "early" values along the first axis 102 and the "smooth" value along the third axis 106. Similarly, the "overburn" value along the second axis 104 could be moved closer to the origin 108 of the multi-axis chart 100 than the "late" value along the first axis 102 and the "light," "moderate," and "heavy" values along the third axis 106.

In FIG. 1 (and in FIGS. 4 and 5, the discussion of which follows), the illustrated values along the axes 102, 104, and 106 do not necessarily represent all of the possible values. For example, the first apex 132 of the third triangle 130 in FIG. 1 intersects the first axis 102 at a value between the "on time" and "early" values. Thus, according to the flight plan represented by the third triangle 130, the aircraft is arriving earlier than planned according to the original flight plan. However, even earlier arrival times are contemplated and/or possible. As another example, the second apex 124 of the second triangle 120 in FIG. 1 intersects the second axis 104 between "plan" and "underburn" values. Thus, according to the flight plan represented by the second triangle 120, less fuel is being used than planned according to the original flight plan. However, additional fuel savings are contemplated and/or possible. As yet another example, the third apex 136 of the third triangle in FIG. 1 intersects the third axis 106 at a value between the "light" and "moderate" values. Thus, according to the flight plan represented by the third triangle 130, the aircraft is expected to encounter turbulence that is between "light" and "moderate" in magnitude.

In at least one aspect, the outer bounds of the values along the axes 102, 104, and 106 of the chart can be determined based on theoretical calculations. For example, with respect to the first axis 102, the "early" value along the first axis 102 can be a value based on the aircraft flying directly from the departure location to the arrival location at maximum speed. The aircraft is not capable of reaching the arrival location any earlier. As another example, the "late" value along the first axis 102 can be a value based on the aircraft flying a path to the arrival location that uses all of the available range for the aircraft, based on fuel on board, and at a slowest possible cruise speed.

As another example, with respect to the second axis 104, the "underburn" value along the second axis 104 can be a value based on the aircraft flying directly from the departure location to the arrival location at the most economical cruise speed. As another example, the "overburn" value along the second axis 104 can be a value based on the aircraft using all of the fuel on board. As discussed above, the "underburn" and "overburn" values could include other factors such as crew overtime expenses and per-hour costs for the aircraft. In such aspects, the most-efficient operation (i.e., the highest-possible "underburn" value) may not be a flight plan flown at the most-efficient cruise speed. Instead, in certain scenarios, the most-efficient operation may be a flight plan flown at a slightly higher speed that arrives earlier and avoids crew overtime expenses, for example.

As another example, with respect to the third axis 106, the "smooth" value can be based on no turbulence in the air. The "light," "moderate," and "heavy" values can be based on turbulence magnitudes measured using a hot-wire anemometer or eddy dissipation rates measured by radar. Alternatively, the "light," "moderate," and "heavy" values can be based on pilot reports of turbulence.

In the aspects discussed herein, the three axes of the multi-axis chart are arranged 120° apart from one another. In various other aspects, the multi-axis chart could have more than three axes in the event additional flight plan characteristics are being considered. For example, the multi-axis chart could include four axes in the event that a fourth flight plan characteristic is being considered. In such an example, the four axes of the multi-axis chart could be arranged 90° apart from one another. As another example, the multi-axis chart could include five axes in the event that a fifth flight plan characteristic is being considered. In such an example, the five axes of the multi-axis chart could be arranged 72° apart from one another.

In block 310, an initial flight plan with first values for the on-schedule operation characteristic, the ride quality characteristic, and vehicle operation efficiency characteristic is received. With reference to FIG. 2, the initial flight plan can be received via the data input 208. In block 312, a first triangle is overlaid on the multi-axis chart with apexes of the first triangle intersecting the axes of the multi-axis chart at locations corresponding to the first values. In block 314, an updated flight plan with second values for the on schedule operation characteristic, the ride quality characteristic, and the vehicle operation efficiency characteristic is received. Again, the updated flight plan can be received via the data input 208. In block 316, a second triangle is overlaid on the multi-axis chart with apexes of the second triangle intersecting the axes of the multi-axis chart at locations corresponding to the second values.

Figure 4:
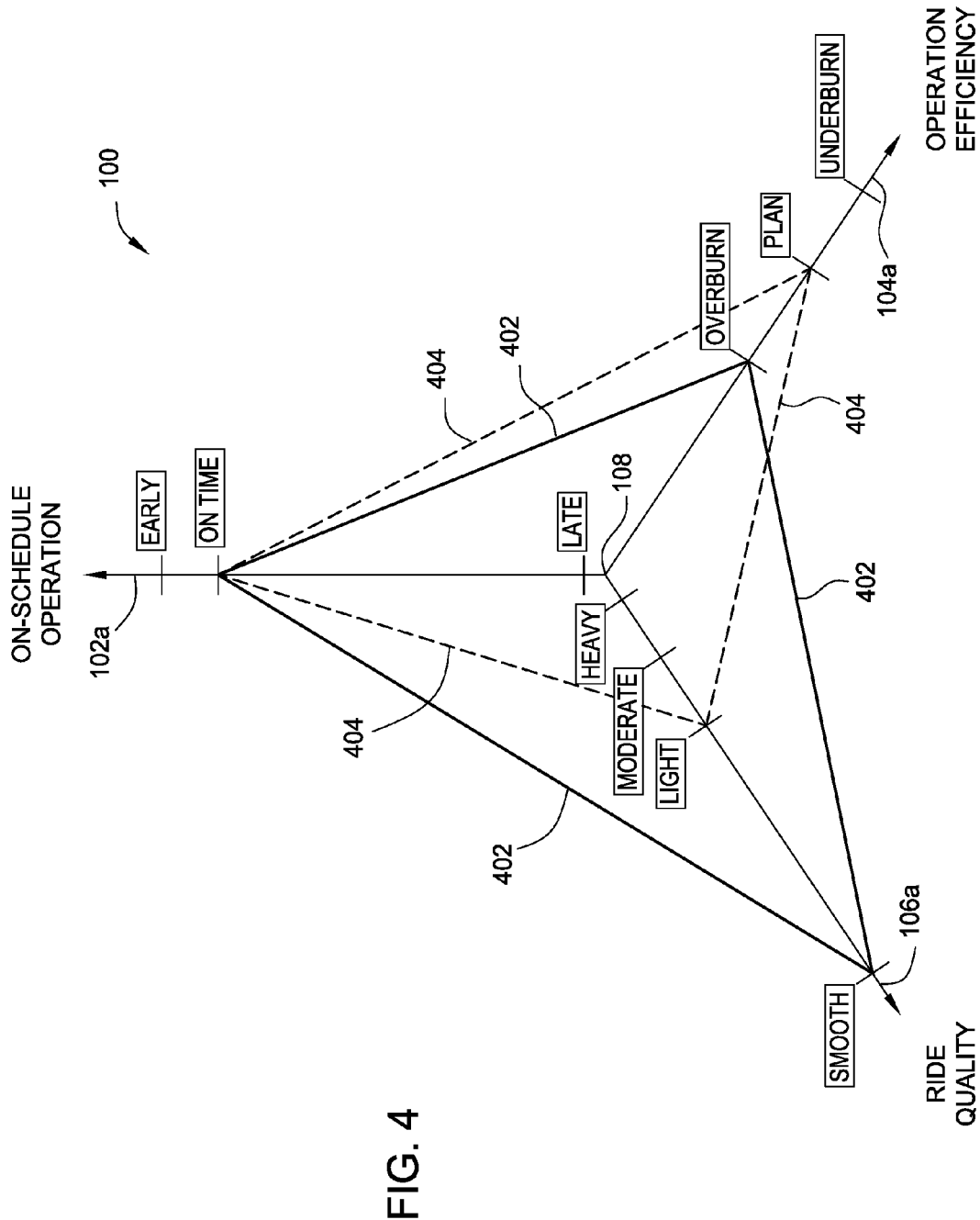
FIG. 4 is another exemplary GUI illustrating the multi-axis chart of FIG. 1, wherein values of the axes of the multi-axis chart are weighted differently than in FIG. 1, and wherein two triangles representing two different flight plans are overlaid thereon.
Figure 5:
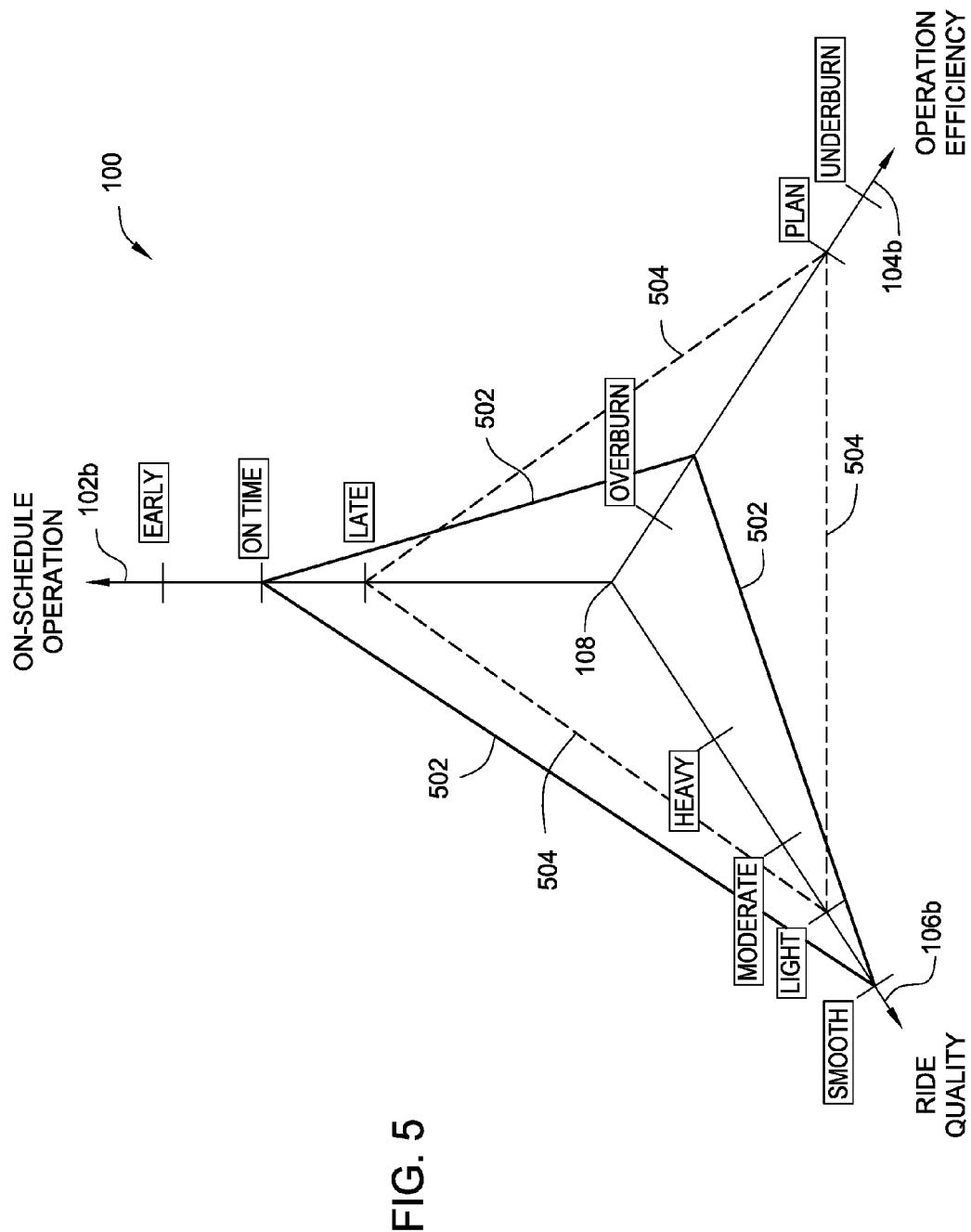
FIG. 5 is another exemplary GUI illustrating the multi-axis chart of FIG. 1, wherein values of the axes of the multi-axis chart are weighted differently than in FIG. 1, and wherein two triangles representing two different flight plans are overlaid thereon.

FIGS. 4 and 5 illustrate different scenarios that results in different tradeoff preferences and therefore different triangles. FIG. 4 illustrates a multi-axis chart 100 for a "premium" airline that emphasizes on-time performance and passenger comfort. Such an airline may be willing to accept significant amounts of operating inefficiency to provide passengers with a smooth ride and on-time performance. For example, such an airline may be willing to significantly deviate from its planned route to avoid turbulence and to increase cruising speed to account for the extra travel distance of such a deviation to avoid being late, even though the increased speed results in more fuel being used. The weightings of the values on the axes of the multi-axis chart 100 in FIG. 4 reflect such tradeoff preferences for this "premium" airline. The first axis 102a includes an "on time" value and an "early" value that have been moved relatively far away from the origin 108 of the multi-axis chart 100 and a "late" value that has been moved very close to the origin 108. As a result, the values for the schedule characteristic are weighted such that on time or early arrivals may result in a large triangle and late arrivals result in a smaller triangle. The second axis 104a includes an "over burn" value, a "plan" value, and an "under burn" value that are all moved relatively far away from the origin 108 of the multi-axis chart 100. As a result, the values for the operation efficiency characteristic are weighted such that fuel usage does not affect the size of the triangle as much as a late arrival. The third axis 106a includes a "smooth" value that is moved relatively far away from the origin 108 of the multi-axis chart 100 and "light," "moderate," and "heavy" values that are moved significantly closer to the origin 108. As a result, the values for the ride quality characteristic are weighted such that a smooth flight may result in a large triangle and bumpy flights result in significantly smaller triangles. Furthermore, the values of the ride quality characteristic are weighted such that fuel usage does not affect the size of the triangle as much as a smooth ride and also such that an early or on-time arrival does not affect the size of the triangle as much as a smooth ride.

FIG. 4 illustrates a first triangle 402 (illustrated in solid line) and a second triangle 404 (illustrated in broken line) overlaid on the multi-axis chart 100. The first triangle 402 represents a first flight plan that results in a smooth ride and an on-time arrival, but also results in an over burn (i.e., excessive fuel usage). The second triangle 404 represents a second flight plan that results in an on-time arrival and fuel usage according to plan, but also results in the aircraft flying through light turbulence. In an exemplary scenario, during operation of an aircraft for the "premium" airline, a pilot may be presented with the multi-axis chart 100 and the overlaid triangles 402 and 404 in the event that an initial flight plan for the aircraft results in the aircraft encountering unexpected turbulence (e.g., due to a developing storm). The first flight plan, represented by the first triangle 402, may deviate around the turbulent air and increase airspeed to maintain an on-time arrival. The second flight plan, represented by the second triangle 404, may fly through the turbulent air according to the initial flight plan. Based on the above-described weightings of the values for the characteristics, the first triangle 402 is larger than the second triangle 404. The pilot would be able to readily discern the difference in size and therefore determine that the first flight plan corresponding to the first triangle 402 is the better option, based on the "premium" airline's strategies.

FIG. 5 illustrates a multi-axis chart 100 for a "low cost" airline that emphasizes cheap tickets. Such an airline may be willing to accept at least some passenger discomfort and scheduling irregularities to save costs and offer lower ticket prices. For example, such an airline may be willing to fly through turbulent weather to avoid deviations that would increase flight time and fuel usage. Such an airline may also be willing to continue flying at a most-efficient cruise speed after a deviation (e.g., due to traffic or around severe weather) at the expense of a delayed arrival. The weightings of the values on the axes of the multi-axis chart 100 in FIG. 5 reflect such tradeoff preferences for this "low cost" airline. The first axis 102b includes "on time," "early," and "late" values that are all moved relatively far away from the origin 108 of the multi-axis chart 100. As a result, the values for the on-schedule operation characteristic are weighted such the value of the characteristic for a particular flight plan does not significantly affect the size of the triangles. The second axis 104b includes an "over burn" value and a "plan" value that have been moved relatively far away from the origin 108 of the multi-axis chart 100, and an "under burn" that has been moved very close to the origin 108. As a result, the values for the operation efficiency characteristic are weighted such that "plan" and "underburn" values for the operation efficiency characteristic result in a large triangle and "overburn" values result in a smaller triangle. Additionally, the values of the operation efficiency characteristic are weighted such that excess fuel usage affects the size of the triangles more than a late arrival. The third axis 106b includes "smooth," "light," "moderate," and "heavy" values that are all moved relatively far away from the origin 108 of the multi-axis chart 100. As a result, the values for the ride quality characteristic are weighted such that the value of the ride quality characteristic for a particular flight plan does not significantly affect the size of the triangles. Furthermore, the values of the ride quality characteristic are weighted such that the fuel usage affects the size of the triangle much more than turbulence, and turbulence and on-time performance affect the size of a triangle approximately equally.

FIG. 5 illustrates a first triangle 502 (illustrated in solid line) and a second triangle 504 (illustrated in broken line) overlaid on the multi-axis chart 100. The first triangle 502 represents a first flight plan that results in a smooth ride and an on-time arrival, but also results in an overburn compared to the original flight plan. The second triangle 404 represents a flight plan that results in a slightly bumpy ride and a late arrival, but also results in fuel usage according to the original flight plan. During the operation of an aircraft for the "low cost" airline, a pilot may be presented with the multi-axis chart 100 of FIG. 5 and the overlaid triangles 502 and 504 in the event that an initial flight plan for the aircraft results in the aircraft encountering unexpected turbulence (e.g., due to a developing storm). The first flight plan, represented by the first triangle 502, may deviate around the turbulent air and increase airspeed to maintain an on-time arrival. The second flight plan, represented by the second triangle 504, may deviate around some of the most-severe parts of the unexpected turbulence and may also slow down to cruise at a more economical speed such that fuel is conserved, resulting in a late arrival and fuel usage in accordance with the original flight plan. Based on the above-described weightings of the values for the characteristics, the second triangle 504 is larger than the first triangle 502. The pilot would be able to readily discern the differences in size and therefore determine that the second flight plan corresponding to the second triangle 504 is the better option, based on the "low cost" airline's strategies.

In the above-described aspects, the axes 102, 104, and 106 are weighted such that larger triangles represent better flight plans than smaller triangles. Other visual weighting schemes are contemplated herein. For example, in certain aspects, the triangles could be weighted in a different manner, such as weightings such that the best flight plan results in an equilateral triangle. Thus, a triangle that is heavily skewed toward one particular axis of the multi-axis 100 chart may represent a flight plan that is less preferable than a triangle that is approximately equilateral on the multi-axis chart 100 (i.e., the apexes of the triangle are approximately equidistant from the origin 108 of the multi-axis chart).

Aspects described herein may take the form of an entirely hardware aspect, an entirely software aspect (including firmware, resident software, micro-code, etc.) or an aspect combining software and hardware aspects that may all generally be referred to herein as a "circuit," "module" or "system."

Aspects may be a system, a method, and/or a computer program product. The computer program product may include a computer readable storage medium (or media) having computer readable program instructions thereon for causing a processor to carry out aspects described herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations described herein may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects described herein.

Aspects are described herein with reference to flowchart illustrations and/or block diagrams of methods, apparatus (systems), and computer program products according to aspects described herein. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects described herein. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various aspects have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

While the foregoing is directed to aspects, other and further aspects described herein may be devised without departing from the basic scope thereof, and the scope thereof is determined by the claims that follow.

What is claimed is:

1. An aircraft system, comprising:
   a computer display screen;
   a computer processor; and
   a computer memory in communication with the computer processor, and operable to store:
      tradeoff preferences for a user, comprising:
         a first tradeoff preference between an on-schedule operation characteristic and a ride quality characteristic of flight plans;
         a second tradeoff preference between the ride quality characteristic and an operation efficiency characteristic of the flight plans; and
         a third tradeoff preference between the operation efficiency characteristic and the on-schedule operation characteristic for the flight plans; and
      an application that, when executed on the computer processor:
         outputs for display on the computer display screen an image of a multi-axis chart, wherein the multi-axis chart comprises:
            a first axis for on-schedule operation, wherein values for the on-schedule operation characteristic along the first axis are weighted based on the tradeoff preferences;
            a second axis for ride quality, wherein values for the ride quality characteristic along the second axis are weighted based on the tradeoff preferences; and
            a third axis for operation efficiency, wherein values for the operation efficiency characteristic along the third axis are weighted based on the tradeoff preferences;
         receives an initial flight plan that includes a first on-schedule operation characteristic value, a first ride quality characteristic value, and a first operation efficiency characteristic value; and
         overlays on the multi-axis chart a first triangle, wherein apexes of the first triangle are aligned with the axes of the multi-axis chart such that a first apex of the first triangle intersects the first axis of the multi-axis chart at a location corresponding to the first on-schedule operation characteristic value, a second apex of the first triangle intersects the second axis of the multi-axis chart at a location corresponding to the first ride quality characteristic value, and a third apex of the first triangle intersects the third axis of the multi-axis chart at a location corresponding to the first operation efficiency characteristic value.

2. The aircraft system of claim 1, wherein the application, when executed by the computer processor, further:
   receives a first updated flight plan that includes a second on-schedule operation characteristic value, a second ride quality characteristic value, and a second operation efficiency characteristic value; and
   overlays on the multi-axis chart a second triangle, wherein apexes of the second triangle are aligned with the axes of the multi-axis chart such that a fourth apex of the second triangle intersects the first axis of the multi-axis chart at a location corresponding to the second on-schedule operation characteristic value, a fifth apex of the second triangle intersects the second axis of the multi-axis chart at a location corresponding to the second ride quality characteristic value, and a sixth apex of the second triangle intersects the third axis of the multi-axis chart at a location correspond to the second operation efficiency characteristic value.

3. The aircraft system of claim 2, wherein the second triangle replaces the first triangle.

4. The aircraft system of claim 2, wherein the second triangle is overlaid on top of the first triangle.

5. The aircraft system of claim 4, wherein the second triangle is displayed in a partially transparent manner such that the first triangle is not obscured by the second triangle.

6. The aircraft system of claim 2, wherein the application, when executed by the computer processor, further:
   receives a second updated flight plan that includes a third on-schedule operation characteristic value, a third ride quality characteristic value, and a third operation efficiency characteristic value; and
   overlays on the multi-axis chart a third triangle, wherein apexes of the third triangle are aligned with the axes of the multi-axis chart such that a seventh apex of the third triangle intersects the first axis of the multi-axis chart at a location corresponding to the third on-schedule operation characteristic value, an eighth apex of the third triangle intersects the second axis of the multi-axis chart at a location corresponding to the third ride quality characteristic value, and a ninth apex of the third triangle intersects the third axis of the multi-axis chart at a location correspond to the third operation efficiency characteristic value.

7. The aircraft system of claim 6, wherein the third triangle is overlaid on top of the first triangle and the second triangle.

8. A computer-implemented method, comprising:
   receiving tradeoff preferences for a user, the tradeoff preferences comprising:
      a first tradeoff preference between an on-schedule operation characteristic and a ride quality characteristic of flight plans;
      a second tradeoff preference between the ride quality characteristic and an operation efficiency characteristic of the flight plans; and
      a third tradeoff preference between the operation efficiency characteristic and the on-schedule operation characteristic of the flight plans;
   outputting for display on a computer display screen an image of a multi-axis chart, wherein the multi-axis chart comprises:
      a first axis for on-schedule operation, wherein values for the on-schedule operation characteristic along the first axis are weighted based on the tradeoff preferences;
      a second axis for ride quality, wherein values for the ride quality characteristic along the second axis are weighted based on the tradeoff preferences; and
      a third axis for operation efficiency, wherein values for the operation efficiency characteristic along the third axis are weighted based on the tradeoff preferences;
   receiving an initial flight plan that includes a first on-schedule operation characteristic value, a first ride quality characteristic value, and a first operation efficiency characteristic value; and
   overlaying on the multi-axis chart a first triangle, wherein apexes of the first triangle are aligned with the axes of the multi-axis chart such that a first apex of the first triangle intersects the first axis of the multi-axis chart at a location corresponding to the first on-schedule operation characteristic value, a second apex of the first triangle intersects the second axis of the multi-axis chart at a location corresponding to the first ride quality characteristic value, and a third apex of the first triangle intersects the third axis of the multi-axis chart at a location correspond to the first operation efficiency characteristic value.

9. The computer-implemented method of claim 8, further comprising:
receiving a first updated flight plan that includes a second on-schedule operation characteristic value, a second ride quality characteristic value, and a second operation efficiency characteristic value; and
overlaying on the multi-axis chart a second triangle, wherein apexes of the second triangle are aligned with the axes of the multi-axis chart such that a fourth apex of the second triangle intersects the first axis of the multi-axis chart at a location corresponding to the second on-schedule operation characteristic value, a fifth apex of the second triangle intersects the second axis of the multi-axis chart at a location corresponding to the second ride quality characteristic value, and a sixth apex of the second triangle intersects the third axis of the multi-axis chart at a location correspond to the second operation efficiency characteristic value.

10. The computer-implemented method of claim 9, wherein the second triangle replaces the first triangle.

11. The computer-implemented method of claim 9, wherein the second triangle is overlaid on top of the first triangle.

12. The computer-implemented method of claim 11, wherein the second triangle is displayed in a partially transparent manner such that the first triangle is not obscured by the second triangle.

13. The computer-implemented method of claim 9, further comprising:
receiving a second updated flight plan that includes a third on-schedule operation characteristic value, a third ride quality characteristic value, and a third operation efficiency characteristic value; and
overlaying on the multi-axis chart a third triangle, wherein apexes of the third triangle are aligned with the axes of the multi-axis chart such that a seventh apex of the third triangle intersects the first axis of the multi-axis chart at a location corresponding to the third on-schedule operation characteristic value, an eighth apex of the third triangle intersects the second axis of the multi-axis chart at a location corresponding to the third ride quality characteristic value, and a ninth apex of the third triangle intersects the third axis of the multi-axis chart at a location correspond to the third operation efficiency characteristic value.

14. The computer-implemented method of claim 13, wherein the third triangle is overlaid on top of the first triangle and the second triangle.

15. A computer program product for displaying tradeoffs for an aircraft flight plan, the computer program product comprising:
a computer-readable storage medium having computer-readable program code embodied therewith, the computer-readable program code executable by one or more computer processors to:
receive tradeoff preferences for a user, the tradeoff preferences comprising:
a first tradeoff preference between an on-schedule operation characteristic and a ride quality characteristic of flight plans;
a second tradeoff preference between the ride quality characteristic and an operation efficiency characteristic of the flight plans; and
a third tradeoff preference between the operation efficiency characteristic and the on-schedule operation characteristic of the flight plans;
output for display on a computer display screen an image of a multi-axis chart, wherein the multi-axis chart comprises:
a first axis for on-schedule operation, wherein values for the on-schedule operation characteristic along the first axis are weighted based on the tradeoff preferences;
a second axis for ride quality, wherein values for the ride quality characteristic along the second axis are weighted based on the tradeoff preferences; and
a third axis for operation efficiency, wherein values for the operation efficiency characteristic along the third axis are weighted based on the tradeoff preferences;
receive an initial flight plan that includes a first on-schedule operation characteristic value, a first ride quality characteristic value, and a first operation efficiency characteristic value; and
overlay on the multi-axis chart a first triangle, wherein apexes of the first triangle are aligned with the axes of the multi-axis chart such that a first apex of the first triangle intersects the first axis of the multi-axis chart at a location corresponding to the first on-schedule operation characteristic value, a second apex of the first triangle intersects the second axis of the multi-axis chart at a location corresponding to the first ride quality characteristic value, and a third apex of the first triangle intersects the third axis of the multi-axis chart at a location correspond to the first operation efficiency characteristic value.

16. The computer program product of claim 15, wherein the computer-readable program code is further executable to:
receive a first updated flight plan that includes a second on-schedule operation characteristic value, a second ride quality characteristic value, and a second operation efficiency characteristic value; and
overlay on the multi-axis chart a second triangle, wherein apexes of the second triangle are aligned with the axes of the multi-axis chart such that a fourth apex of the second triangle intersects the first axis of the multi-axis chart at a location corresponding to the second on-schedule operation characteristic value, a fifth apex of the second triangle intersects the second axis of the multi-axis chart at a location corresponding to the second ride quality characteristic value, and a sixth apex of the second triangle intersects the third axis of the multi-axis chart at a location correspond to the second operation efficiency characteristic value.

17. The computer program product of claim 16, wherein the second triangle replaces the first triangle.

18. The computer program product of claim 16, wherein the second triangle is overlaid on top of the first triangle.

19. The computer program product of claim 18, wherein the second triangle is displayed in a partially transparent manner such that the first triangle is not obscured by the second triangle.

20. The computer program product of claim 16, wherein the computer-readable program code is further executable to:

receive a second updated flight plan that includes a third on-schedule operation characteristic value, a third ride quality characteristic value, and a third operation efficiency characteristic value; and overlay on the multi-axis chart a third triangle, wherein apexes of the third triangle are aligned with the axes of the multi-axis chart such that a seventh apex of the third triangle intersects the first axis of the multi-axis chart at a location corresponding to the third on-schedule operation characteristic value, an eighth apex of the third triangle intersects the second axis of the multi-axis chart at a location corresponding to the third ride quality characteristic value, and a ninth apex of the third triangle intersects the third axis of the multi-axis chart at a location correspond to the third operation efficiency characteristic value.

* * * * *